(12) United States Patent
Jiang et al.

(10) Patent No.: US 7,447,334 B1
(45) Date of Patent: Nov. 4, 2008

(54) MOTION RECOGNITION SYSTEM

(75) Inventors: Qin Jiang, Woodland Hills, CA (US); Cynthia E. Daniell, Pasadena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 660 days.

(21) Appl. No.: 11/096,355

(22) Filed: Mar. 30, 2005

(51) Int. Cl.
*G06K 9/00* (2006.01)
*G06K 9/62* (2006.01)
*H04N 7/18* (2006.01)

(52) U.S. Cl. .................. 382/103; 382/224; 348/143
(58) Field of Classification Search .............. 382/103, 382/224; 348/143
See application file for complete search history.

(56) References Cited

U.S. PATENT DOCUMENTS

| 4,396,903 | A  | * | 8/1983  | Habicht et al. | 382/103 |
| 6,819,778 | B2 | * | 11/2004 | Kamei          | 382/103 |
| 7,177,447 | B2 | * | 2/2007  | Olson et al.   | 382/103 |
| 2003/0169906 | A1 | * | 9/2003 | Gokturk et al. | 382/115 |
| 2005/0104958 | A1 | * | 5/2005 | Egnal et al.   | 348/143 |
| 2005/0134685 | A1 | * | 6/2005 | Egnal et al.   | 348/157 |

OTHER PUBLICATIONS

Collins et al., "A System for Video Surveillance and Monitoring" Technical Report CMU-RI-TR-00-12, Robotics Institute, Carnegie-Mellon University, May 2000.*

James J. Little and Jeffrey E. Boyd, "Recognizing People by their gait: The shap of motion," Videre: Journal of Computer Vision Research, vol. 1, No. 2, pp. 1-32, The MIT Press, 1998.

J.W. Davis and A.F. Bobick, "The Representation and recognition of Human Movement Using Temporal Templates," Proc. Of IEEE Computer Vision and Pattern Recognition, pp. 928-934, 1997.

Amit Kale, A.N. Rajagopalan and Rama Chellappa, "Recognition of Human Using Gait," the Proceedings of the Federal Labs Symposium, pp. 1-6, Mar. 2001.

V. Vapnik, S. Golowich, and A. Smola, "Support vector method for function approximation, regression estimation, and signal processing," Advance in Neural Information Processing Systems, vol. 9, pp. 281-287, 1996.

* cited by examiner

*Primary Examiner*—Colin LaRose
(74) *Attorney, Agent, or Firm*—Tope-McKay & Associates

(57) ABSTRACT

The present invention relates to a motion recognition system for distinguishing motion between two different entity forms, such as distinguishing human motion from animal motion. The motion recognition system comprises a moving object detection component, a motion feature extraction component, and a motion feature classification component. The moving object detection component is configured to detect an object within a video sequence and generate a moving object signal. The motion feature extraction component is configured to receive the moving object signal and to extract features representing the detected object within the object signal. The motion feature classification component is configured to classify the features extracted from the detected object as either human motion or animal motion, thereby generating an identification signal. Through detecting, extracting and classifying the objection, a user can determine if the object is a human or an animal.

30 Claims, 7 Drawing Sheets

|   |   | Computed Classes | |
|---|---|---|---|
|   |   | Human Motion | Animal Motion |
| True Classes | Human Motion | 0.95 | 0.05 |
| | Animal Motion | 0.10 | 0.90 |

Data Samples

|  | | Computed Classes | |
|---|---|---|---|
|  | | Human Motion | Animal Motion |
| True Classes | Human Motion | 0.95 | 0.05 |
| | Animal Motion | 0.10 | 0.90 |

FIG. 8

MOTION RECOGNITION SYSTEM

BACKGROUND OF THE INVENTION (1) Technical Field

The present invention relates to a system for recognizing motion, and more particularly, to motion recognition system that recognizes entity motions to distinguish human motion from animal motion using video streams.

(2) Description of Related Art

An ability to distinguish human motion from animal motion is important in many applications, such as out-door surveillance systems for homeland security and collision avoidance systems for automobile safety. A challenge for such a system is to develop an ability to extract motion features that can characterize human motion and animal motion effectively. One possible approach is to distinguish two-legged motion from four-legged motion. However, to extract the number of legs from each entity in a motion sequence is computationally expensive and requires high quality input images. Additionally, infrared (IR) video sequences obtained outdoors generally cannot deliver the high quality required to do this reliably.

Only a few techniques to distinguish human motion from animal motion using IR video sequences have been disclosed. Most existing techniques focus on the recognition of various types of human activities using video sequences taken in the visual spectrum and are not applicable to IR video sequences. First, most existing techniques require the computation of motion fields that are very difficult to obtain from IR video sequences since IR imagery provides no texture patterns. Second, the existing techniques only work on visual video sequences obtained from artificially controlled environments and lighting conditions. More specifically, the visual video sequences have much better quality than IR video sequences taken from outside scenes. Finally, to distinguish various types of human activities is a different problem than to distinguish human motion from animal motion.

With advances in IR imaging sensors, it is possible to identify various human activities in both daytime and nighttime using IR video streams. Unfortunately, most existing research on identifying human activities has been focused on daytime scenes using visual video streams, which cannot be used at night. Few investigations into recognizing human activities using IR imagery have been reported in the literature, and most existing techniques developed for visual video systems are not applicable for IR video sequences because of the different quality and characters of visual video imagery and IR video imagery. Therefore, it is necessary to develop new techniques for human activity recognition systems using IR video streams.

Thus, a continuing need exists for a system that can distinguish human motion from animal motion using video sequences.

SUMMARY OF INVENTION

The present invention relates to a motion recognition system for distinguishing motion between two entity forms. The motion recognition system comprises a moving object detection component, configured to detect a moving object in a video sequence and generate a moving object signal; a motion feature extraction component, configured to receive the moving object signal and to extract motion features representing the detected object within the object signal; and a motion feature classification component, configured to receive and classify the features extracted from the detected object as either a first entity motion or a second entity motion, and to generate an identification signal. Through detecting, extracting and classifying the objection, a user is provided an identification signal that can used to determine if the object is the first entity form or the second entity form. In another aspect, the first entity is a human, and the second entity is an animal.

In another aspect, the moving object detection component further comprises a frame difference module to catalog separate frames; and a noise filtering module to filter out noise from the separate frames. The frame difference module is a module selected from a group consisting of an infrared frame difference module and a visual video frame difference module. The noise filtering module utilizes a technique selected from a group consisting of a threshold filter for removing objects below a predetermined threshold, and a morphological filter to detect and represent object motion. The morphological filter uses a filter selected from a group consisting of size filter and close filter, where the size filter removes isolated points and small-sized objects and the close filter fills holes inside objects and smoothes the boundary of the objects.

In yet another aspect, the motion feature extraction component is configured to compute a motion representation, compute space-time correlations of the motion representation, and compute statistics of the space-time correlations.

The space-time correlations are computed according to the following, given an input sequence $f(x, y, t)$, the frame difference is defined as $$df(x,y,t)=|f(x,y,t+1)-f(x,y,t)|,$$

with the space-time correlations defined as, $$C_t(t)=Cor(df(x,y,t),df(x,y,t+\Delta t)),$$

$$C_x(x)=Cor(df(x,y,t),df(x+\Delta x,y,t)),$$

$$C_y(y)=Cor(df(x,y,t),df(x,y+\Delta y,t)),$$

where $$Cor(u, v) = \frac{Cov(u, v)}{\sqrt{Var(u)Var(v)}},$$

where $C_t(t)$, $C_x(x)$, and $C_y(y)$ are correlations (Cor) of each corresponding coordinate, and where covariance is denoted by Cov and variance is denoted by Var, and where u and v are any variable in the space time dimension, such as x, y, and t.

Additionally, the statistics of space-time correlations are two statistics, Renyi Entropy and mean value, with the two statistics calculated as motion features.

In another aspect, the mean value is calculated according to the following, $mean_s = E[C_s]$, where $S \in \{x, y, t\}$, and where $E[x]$ denotes the expectation of x and $C_s$ denotes the correlation of s.

Furthermore, the Renyi Entropy is calculated in the frequency domain, according to the following, $$h_s = \frac{1}{1-\alpha} \log_2 \left( \sum_i (p_s(i))^\alpha \right),$$

where $S \in \{x, y, t\}$, with $\alpha > 0$, and with a distribution being computed from a normalized histogram according to the following, $p_s = norm\_hist(f_s)$, where $s \in \{x,y,t\}$, and $f_s = FFT(C_s)$, where $s \in \{x,y,t\}$, where $FFT(C_s)$ denotes the Fast Fourier transformation of $C_s$, p denotes probability, i denotes a probability index, and a is the distributing parameter.

In another aspect, the motion feature classification component is a night vision system using a classifier for separating classes of motion.

Furthermore, the classifier is a classifier selected from a group consisting of a support-vector-machine-based classifier, a Bayesian classifier, a neural network based classifier, a decision tree classifier, and a Gaussian mixture model classifier.

Finally, as can be appreciated by one in the art, the present invention is not limited to a system, but also includes a method, apparatus, and computer program product for performing the operations of the motion recognition system described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8 is a chart illustrating exemplary results of a sample classification.

DETAILED DESCRIPTION

Figure 1:
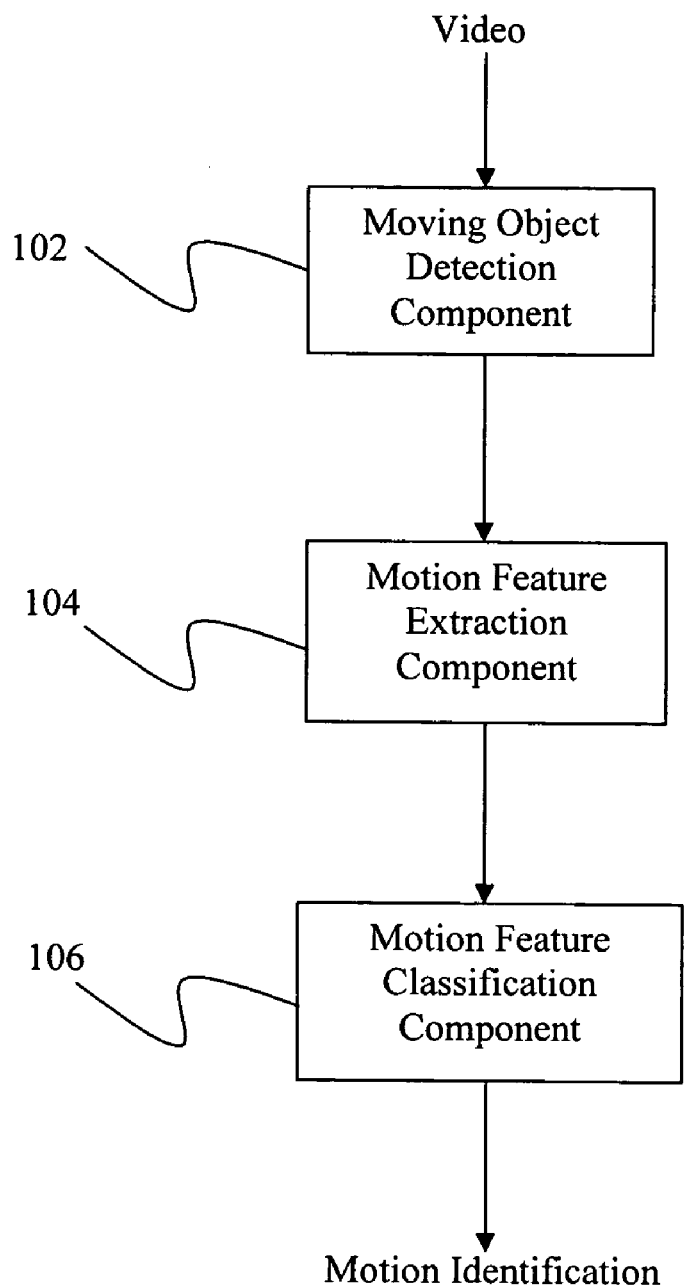
FIG. 1 is a flow chart illustrating a motion recognition system according to the present invention.

The present invention relates to a system for recognizing motion, and more particularly, to motion recognition system that recognizes entity motions to distinguish human motion from animal motion using video streams.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

In order to provide a working frame of reference, first a glossary of terms used in the description and claims is provided. Next, a discussion of various principal aspects of the present invention is provided. Third, an introduction is presented to provide the reader with a general understanding of the present invention. Fourth, a discussion is provided to give an understanding of the specific details of the present invention. Fifth, experimental results are provided for the reader to have a better understanding of the invention in actual use. Finally, a conclusion is provided to summarize key aspects of the present invention.

(1) GLOSSARY

The purpose of this glossary is to provide a working frame of reference regarding some of the terms used in the description and claims. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. The definitions provided should not be considered limiting to the extent that the terms are known in the art.

Close Filter—The term "close filter" refers to a filtering technique that fills holes inside objects and smoothes object boundaries.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations encoded into a computer chip). The "instruction means" may be stored in the memory of a computer or on a computer readable medium such as a floppy disk, a CD-ROM, and a flash drive.

Size Filter—The term "size filter" refers to a technique for removing isolated points and small-sized objects from an image.

(2) PRINCIPAL ASPECTS

The present invention has three "principal" aspects. The first is a system that performs the operations of the present invention to classify motion as either human or animal. The second principal aspect is a method, typically in the form of software and/or manual operations, operated using a data processing system (computer). The third principal aspect is a computer program product. The computer program product generally represents computer-readable code (either source or object code) stored on a computer-readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

(3) INTRODUCTION

The present invention presents a system that can distinguish motion between two different entity forms using video streams, such as infrared (IR) video streams. Although the present invention can be utilized to distinguish motion between any two different living entity forms, for illustrative purposes it is described herein as the difference between human motion and animal motion. Although human motion is completely different from animal motion in terms of the shape of movements, effectively characterizing the two kinds of motions so that computers can distinguish them is a challenging problem. The present invention provides a solution to the problem. In an aspect of the present invention, frame differences are used to represent object motions. Next, correlations are computed in space-time to capture the motion changes. Finally, statistics (e.g., Renyi entropy and mean values) computed from the correlations are used to characterize the two kinds of motions by comparing the statistics with those of known motions (e.g., animal vs. human).

Experimental results show that the system is highly effective in distinguishing human motion from animal motion; for example, with an average classification rate of 92.5%. The present invention can be applied to many applications, such as collision avoidance systems for automobile safety. In addition, it can also be applied to many applications that require surveillance or monitoring, such as 24 hour outdoor surveillance systems.

(4) DISCUSSION

As shown in FIG. 1, to distinguish human motion from animal motion, a human motion recognition system 100 generally includes three components: (i) a moving object detection component 102, (ii) a motion feature extraction component 104, and (iii) a motion feature classification component 106.

(i) Moving Object Detection Component

Many techniques of motion detection can be adopted to achieve the function of the moving object detection component 102, a non-limiting example of which includes using a frame difference module followed by a noise filtering module. The frame difference module is an imaging system that detects moving objects between at least two different frames, non-limiting examples of which include an infrared (IR) video frame difference system and a visible spectrum video frame difference system. Both frame difference systems field a plurality of video sequence frames, identifying a moving object by noting a difference in the objects location in the frame between at least two different frames.

After at least one moving object has been detected between at least two different frames, a noise filtering module is used to isolate the detected object and remove noise (i.e., irrelevant or meaningless data). The noise filtering module utilizes a system and/or technique for removing noise from a data set, non-limiting examples of which include thresholding and morphological filtering. Thresholding is a noise filtering technique that places a value on a detected moving object, and if that value exceeds a predetermined threshold value, then the detected object is recognized as an object. If that value is below the predetermined threshold value, then the data representing the detected object is disregarded as noise.

The present invention may also employ a morphological filter. The morphological filter is a filter that capitalizes on the form and structure of organisms, non-limiting examples of which include a size filter and a close filter. The size filter is a system that removes isolated points and small-sized objects from an image. By removing isolated points and small-sized objects, the motion recognition system is able to more effectively focus on objects of interest. Neither isolated points nor small-sized objects are organisms, or if they are organisms, they are of proportions that are insignificant within the context of a motion recognition system of the present invention. For example, when attempting to detect human motion, the presence of a moving mouse would be a small-sized object that is insignificant within this context.

Due to the nature of a video sequence, an identified object may inadvertently contain holes within the object, or unnatural boundary lines. As such, a close filter is added to the motion recognition system. The close filter is a system that fills the holes inside objects and smoothes the boundaries of the objects. By filling holes inside objects and smoothing the boundaries of objects, the close filter is able to take a detected object and make it more recognizable to the second component of the motion recognition system. After the video sequence has been processed by the various moving object detection components, an object signal is generated for further processing by the motion feature extraction component.

(ii) Motion Feature Extraction Component

The central part of the system is the second component, the motion feature extraction component 104. Whether the two kinds of motions can be well-distinguished largely depends on how well the motion feature extraction component 104 can capture the different characterizations of the different motions. If motion features are effective in separating the two different types of motions (meaning that in the feature space, the two classes of motion are well separable), the motion feature classification becomes an easy job, i.e., available classifiers can be used to finish the classification. In the present invention, a major contribution is the development of a unique and effective technique of motion feature extraction through the motion feature extraction component 104.

Since human versus animal motion can generally be regarded as two-legged motion versus four-legged motion, the number of legs could be a possible feature used to distinguish the two kinds of motion. However, the detection of legs is computationally expensive, and it requires high-quality input images. In general, IR video sequences taken outdoors during nighttime cannot deliver an image quality high enough for leg number detection. Therefore, this feature is not practical for a human motion recognition system using IR video streams. Most existing techniques extract motion features based on optical flow (e.g., motion fields or frame difference). The existing techniques fail to exploit the correlation between the motions at different times. The present invention uses the correlations of motion representation by sampling different frames (i.e., different times) to characterize the shapes of the motions. Therefore, the present invention extracts motion features from the space-time correlations of motion representation present in the object signal.

Figure 2:
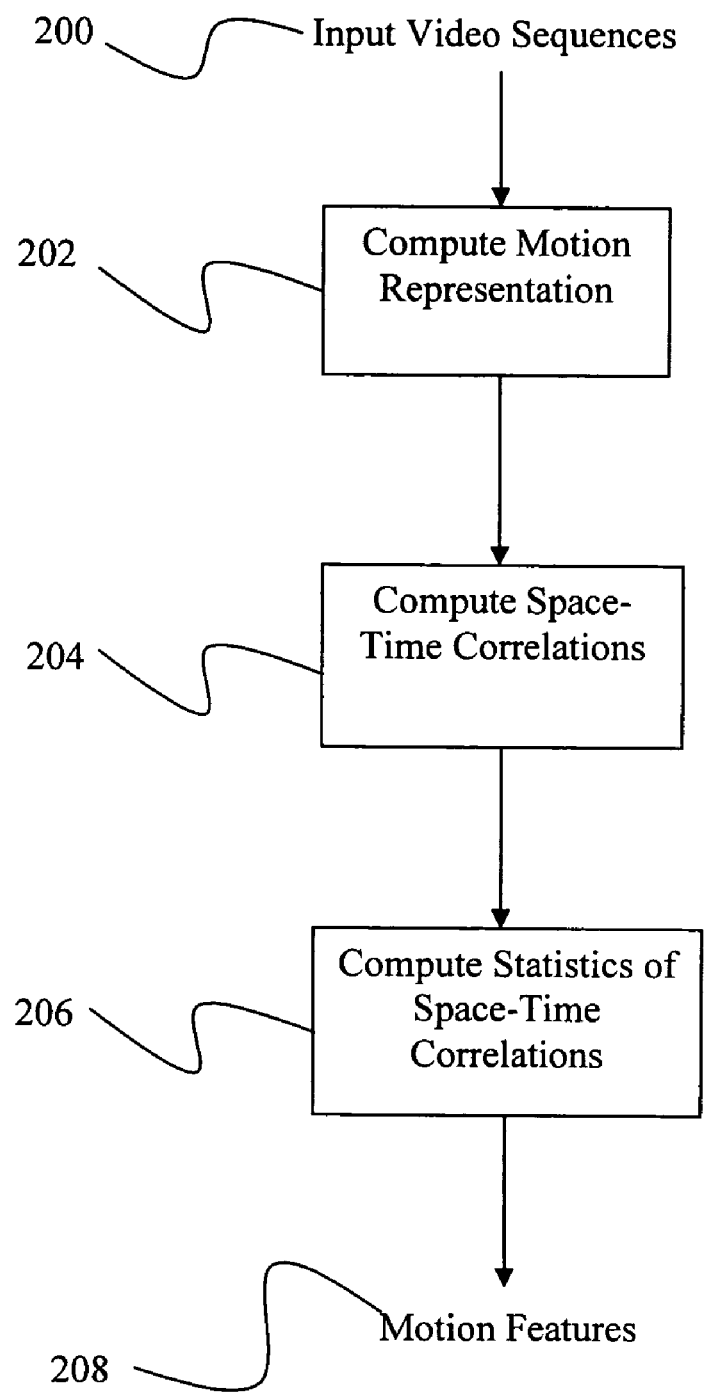
FIG. 2 is a flow chart illustrating motion feature extraction according to the present invention.

FIG. 2 presents a more detailed view of the procedure employed by the motion feature extraction component 104. The motion feature extraction technique is mathematically described as follows.

Given the input video sequence 200 with an x-axis coordinate (x), y-axis coordinate (y) and frame time coordinate (t), represented as f(x, y, t), the frame difference (df(x, y, t)) 202 (i.e., motion representation) between two frames is defined as:

$$df(x,y,t) = |f(x,y,t+\Delta t) - f(x,y,t)|. \quad (1)$$

Using the sequence of frame differences, the space-time correlations 204 can be computed as:

$$C_t(t) = Cor(df(x,y,t), df(x,y,t+\Delta t)), \quad (2)$$

$$C_x(x) = Cor(df(x,y,t), df(x+\Delta x,y,t)), \text{ and} \quad (3)$$

$$C_y(y) = Cor(df(x,y,t), df(x,y+\Delta y,t)), \quad (4)$$

where $$Cor(u, v) = \frac{Cov(u, v)}{\sqrt{Var(u)Var(v)}}, \quad (5)$$

where $C_t(t)$, $C_x(x)$, and $C_y(y)$ are the correlations (Cor) of each corresponding coordinate, and where the covariance is denoted by Cov and the variance is denoted by Var, and where u and v are any variable in the space time dimension, such as x, y, and t. Then, statistics of the space-time correlations 206, such as mean value and Renyi entropy, are calculated to be used as motion features 208. The mean value can be simply defined by the following equation:

$$mean_s = E[C_s], \text{ where } s \in \{x,y,t\}, \quad (6)$$

where E[x] denotes the expectation of x and $C_s$ denotes the correlation of s.

The Renyi entropy is computed in the frequency domain, that is $$h_s = \frac{1}{1-\alpha} \log_2 \left( \sum_i (p_s(i))^\alpha \right),$$

The distribution is computed from a normalized histogram given as follows:

$$p_s = norm\_hist(f_s), \text{ where } s \in \{x,y,t\}, \text{ and} \quad (8)$$

$$f_s = FFT(C_s), \text{ where } s \in \{x,y,t\}. \quad (9)$$

The symbol $FFT(CD_s)$ denotes the Fast Fourier transformation of $C_s$, p denotes probability, i denotes a probability index, and a is the distributing parameter.

(iii) Motion Feature Classification Component

The motion features are then provided to the motion feature classification component 106. As long as motion features are effective for separating the two classes of motions, the choice of classifier is not critical. For example, a support vector machine-based classifier, which is an optimal classifier for two classes, may be used. Additional non-limiting examples of classifiers include a Bayesian classifier, a neural network-based classifier, a decision tree classifier, and a Gaussian mixture model classifier. The motion feature classification component contains classifications of either/both animal and human motion features. The classification component then receives the motion features and assigns the motion features to its appropriate class (i.e., human or animal).

Figure 3:
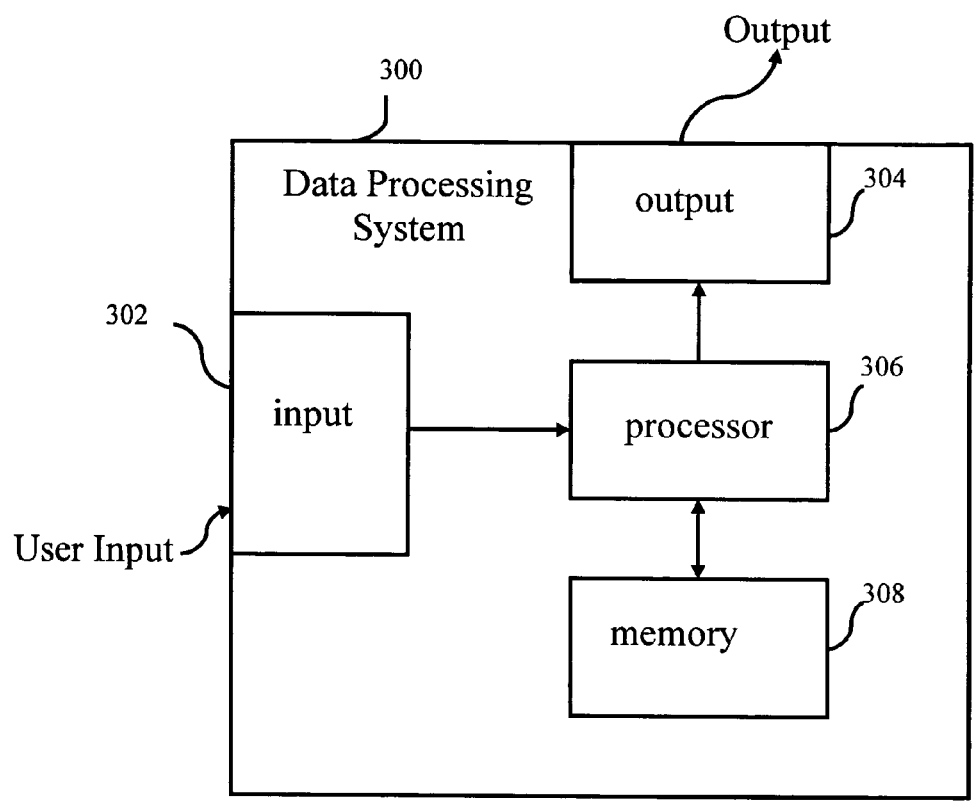
FIG. 3 is a block diagram of a general computer system for use with the present invention.

A block diagram depicting the components of a data processing system 300 used in the present invention is provided in FIG. 3. The data processing system 300 comprises an input 302 for receiving information from a video source, and/or from other components. Information received may include input from devices such as scanners, keypads, keyboards, mice, other peripherals such as storage devices, other programs, etc. The input 302 may include multiple "ports." An output 304 is connected with the processor for providing information for transmission to other data processing systems, to storage devices, to display devices such as monitors, and to other mechanisms for presentation in user-readable forms. Output may also be provided to other devices or other programs, e.g., to other software modules, for use therein. The input 302 and the output 304 are both coupled with a processor 306, which may be a general-purpose computer processor or a specialized processor designed specifically for use with the present invention. The processor 306 is coupled with a memory 303 to permit storage of data and software to be manipulated by commands to the processor.

Figure 4:
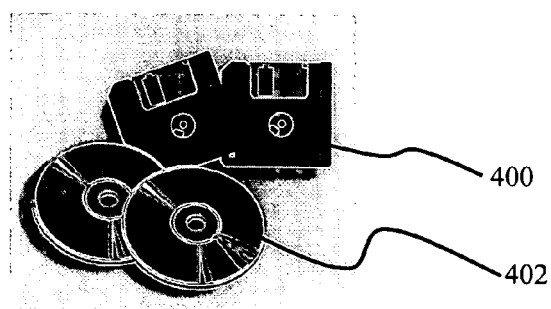
FIG. 4 is an illustrative diagram of a computer-readable medium aspect of the present invention.

An illustrative diagram of a computer program product embodying the present invention is depicted in FIG. 4. The computer program product is depicted as either a floppy disk 400 or an optical disk 402. However, the computer program product generally represents computer readable code stored on any compatible computer readable medium.

(5) EXPERIMENTAL RESULTS

The motion recognition system may be utilized for a wide variety of applications. In order to better understand its functionality and uses, the following experiment was conducted using the system. The following experiments and results are for demonstrative purposes only and are not intended to limit the use and scope of invention described herein. Rather, these results are intended to assist the reader in obtaining a better qualitative understanding of the concepts presented herein.

Human motion sequences (38 human motion sequences) and animal motion sequences (in this case, 12 dog sequences and 26 horse sequences) were used in this experiment to test the technique described herein. The lengths of the sequences varied from 25 frames to 45 frames depending on the speed of the moving objects (human or animal) in the sequences. Some sequences were taken at night, and some were taken during the daytime. All of the sequences were obtained from outdoor scenes. As a result, the backgrounds in the sequences are very noisy and the sizes of the moving objects varied substantially.

Figure 5:
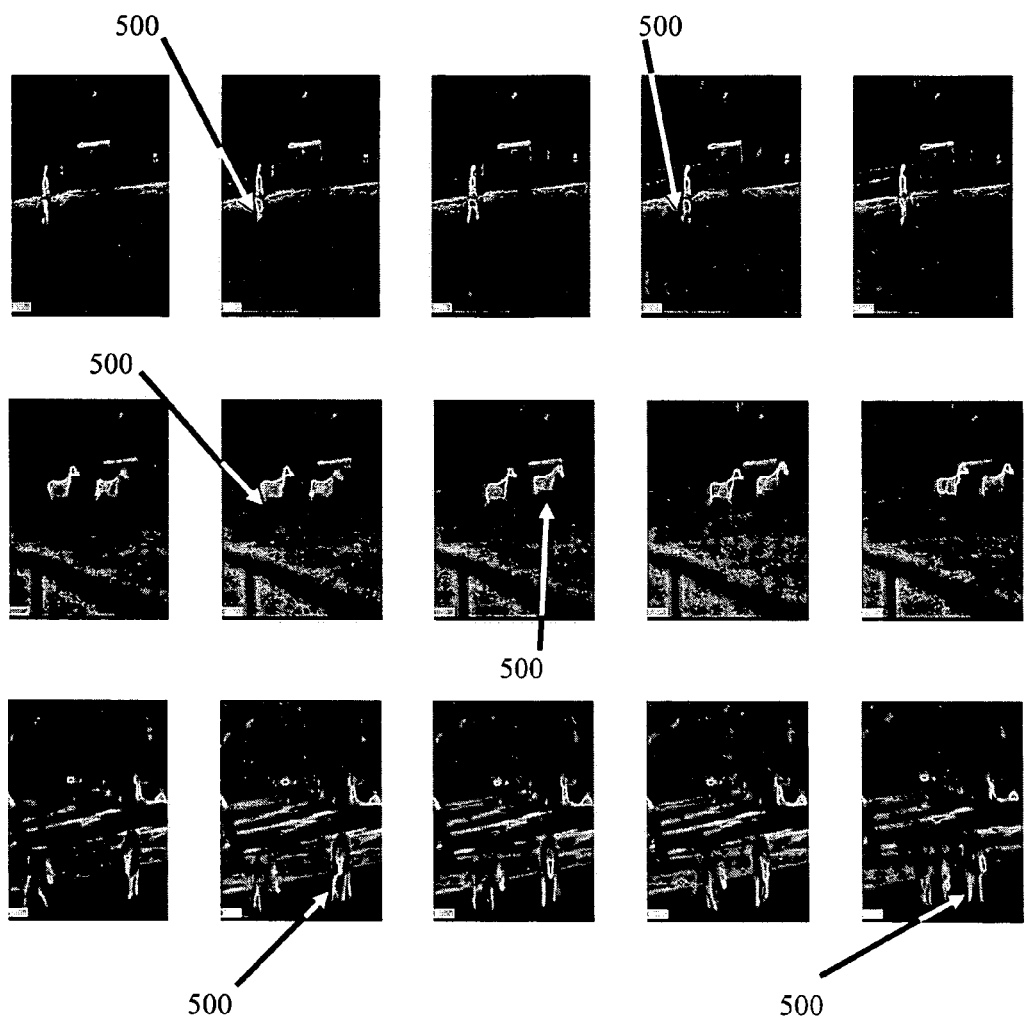
FIG. 5 is an illustration of a plurality of exemplary data samples.

FIG. 5 presents some samples of the testing data. From the data samples, it can be seen that in most cases, it was almost impossible to detect the number of the legs 500 of the moving targets. As discussed above, the motion feature extraction component circumvents the need to detect the number of legs and substantially increases the efficacy of the motion recognition the present invention.

Figure 6:
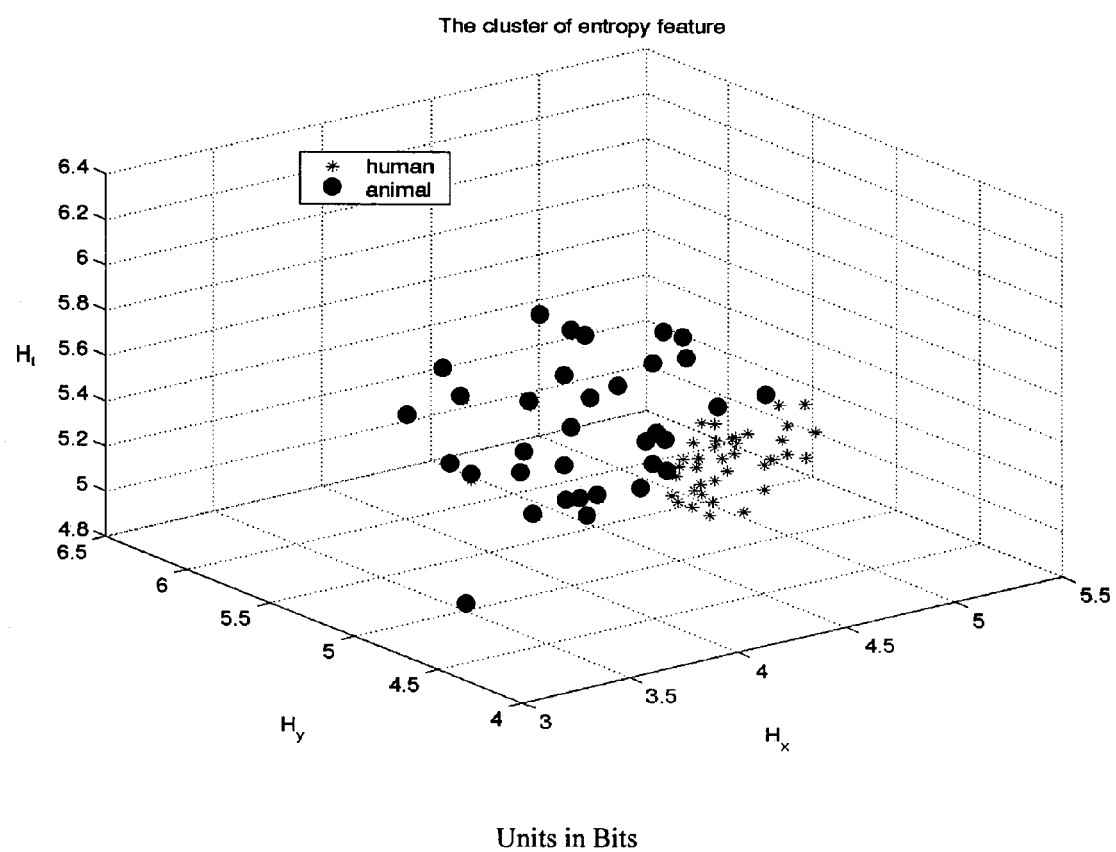
FIG. 6 is a graph illustrating an exemplary cluster of entropy.
Figure 7:
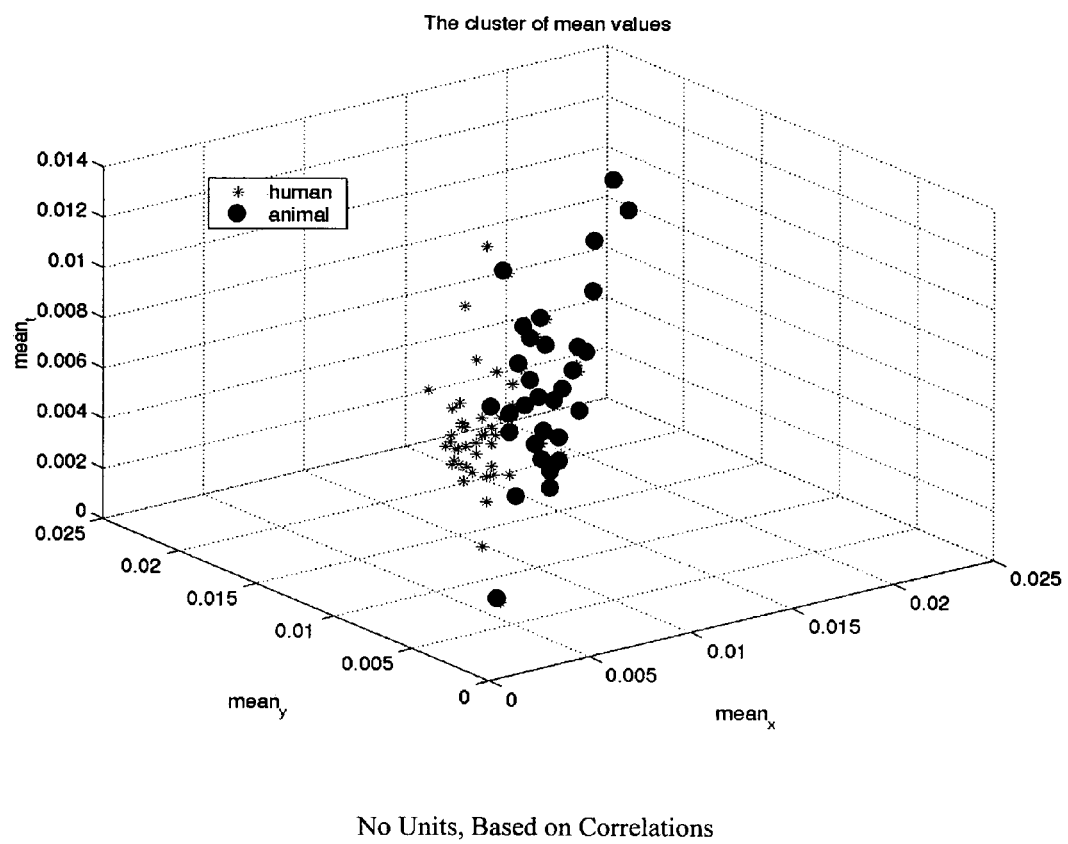
FIG. 7 is a graph illustrating an exemplary cluster of mean values.

To calculate the feature of Renyi entropy, the parameter a was set equal to 0.1 and 1024 point Fast Fourier transformation (FFT) was used. FIG. 6 illustrates the cluster of entropy feature, with units in bits and H being an entropy coordinate in the x, y, and time axes. FIG. 7 illustrates the cluster of mean values in the x, y, and time axes. Note that FIG. 7 does not include any units as the axis parameters were based on correlations. From the clusters of the features, it was shown that the two types of the motions are well separable in the feature space, especially in the subspace of the feature of Renyi entropy.

A support-vector machine-based classifier was used for motion feature classification. For each class, 19 sequences of video were used to train the classifier and 19 sequences of video were used for testing. The results of the classification are summarized in FIG. 8. When human motion was tested, 95% of the time the system classified the motion as human, with 5% of the time being classified as animal motion. Alternatively, when animal motion was tested, the system classified the motion as animal motion 90% of the time, while classifying it as human motion only 10% of the time. In this illustrative example, on average, the system achieved a classification rate of 92.5%.

(6) CONCLUSION

The present invention comprises a human motion recognition system using image frame difference of video streams to represent object motion. The changes of the different motions of human vs. animal are captured by space-time correlations. With the space-time correlations, two statistics, Renyi entropy and mean value, are calculated as motion features. A classifier, such as a support vector machine-based classifier, is used to classify the motion features. Experimental tests show that with the innovative motion features, the motion recognition system can achieve a good classification rate, with an average classification rate of 92.5%.

What is claimed is:

1. A motion recognition system for distinguishing motion between two different entity forms, comprising:
   a moving object detection component, configured to detect a moving object in a video sequence and generate a moving object signal;
   a motion feature extraction component, configured to receive the moving object signal and to generate a motion representation, generate space-time correlations of the motion representation, and generate statistics of the space-time correlations for the detected object within the object signal, where the statistics of the space-time correlations are two statistics, Renyi Entropy and mean value, with the two statistics calculated as motion features; and
   a motion feature classification component, configured to receive and classify the features extracted from the detected object as either a first entity motion or a second entity motion, and to generate an identification signal, whereby through detecting, extracting and classifying the object, it is determined if the object is either a first entity form or a second entity form.

2. A motion recognition system as set forth in claim 1, wherein the moving object detection component further comprises;
   a frame difference module to catalog separate frames in a video sequence; and
   a noise filtering module to filter out noise from the separate frames.

3. A motion recognition system as set forth in claim 2, wherein the frame difference module is a module selected from a group consisting of an infrared video frame difference module and a visible spectrum video frame difference module.

4. A motion recognition system as set forth in claim 2, wherein the noise filtering module utilizes a technique selected from a group consisting of a morphological filter to detect and represent object motion; and a threshold filter for placing a value on a detected moving object, and if that value exceeds a predetermined threshold value, then the detected object is recognized as an object, else if that value is below the predetermined threshold value, then data representing the detected object is disregarded as noise.

5. A motion recognition system as set forth in claim 4, wherein the morphological filter uses a filter selected from a group consisting of size filter and close filter, where the size filter removes isolated points and small-sized objects in the video sequence and the close filter fills holes inside objects and smoothes object boundaries.

6. A motion recognition system as set forth in claim 1, wherein the space-time correlations are generated according to the following,
   given an input sequence f(x, y, t), the frame difference is defined as $$df(x,y,t)=|f(x,y,t+1)-f(x,y,t)|,$$

with the space-time correlations defined as, $$C_t(t)=Cor(df(x,y,t),df(x,y,t+\Delta t)),$$

$$C_x(x)=Cor(df(x,y,t),df(x+\Delta x,y,t)),$$

$$C_y(y)=Cor(df(x,y,t),df(x,y+\Delta y,1)),$$

where $$Cor(u,v) = \frac{Cov(u,v)}{\sqrt{Var(u)Var(v)}},$$

where $C_t(t)$, $C_x(x)$, and $C_y(y)$ are correlations (Cor) of each corresponding coordinate, and where covariance is denoted by Cov and variance is denoted by Var, and where u and v are any variable in the space time dimension, such as x, y, and t.

7. A motion recognition system as set forth in claim 1, wherein mean value is calculated according to the following,
   mean$_s$=E[$C_s$], where s$\Delta$\{x, y, t\}, and where E[x] denotes the expectation of x and $C_s$ denotes the correlation of s.

8. A motion recognition system as set forth in claim 1, wherein the Renyi Entropy is calculated in the frequency domain, according to the following, $$h_s = \frac{1}{1-\alpha}\log_2\left(\sum_i (p_s(i))^\alpha\right),$$

where s$\in$\{x, y, t\}, with a>0, and with a distribution being computed from a normalized histogram according to the following, $$p_s=norm\_hist(f_s), \text{ where } s\in\{x,y,t\}, \text{ and}$$

$$f_s=FFT(C_s), \text{ where } s\in\{x,y,t\}, \text{ where}$$

FFT($C_s$) denotes the Fast Fourier transformation of $C_s$, p denotes probability, i denotes a probability index, and a is the distributing parameter.

9. A motion recognition system as set forth in claim 1, wherein the motion feature classification component includes a classifier for separating classes of motion, the classifier being selected from a group consisting of a support-vector-machine-based classifier, a Bayesian classifier, a neural network-based classifier, a decision tree classifier, and a Gaussian mixture model classifier.

10. A motion recognition system as set forth in claim 1, wherein the first entity is a human and the second entity is an animal.

11. A computer program product for distinguishing motion between two different entity forms, comprising computer instruction means stored on a computer readable medium, for:

detecting a moving object within a video sequence and generating a moving object signal;

receiving the moving object signal and generating a motion representation, generating space-time correlations of the motion representation, and generating statistics of the space-time correlations for the detected object within the moving object signal, where the statistics of the space-time correlations are two statistics, Renyi Entropy and mean value, with the two statistics calculated as motion features; and receiving and classifying the motion features extracted from the detected object as either a first entity motion or a second entity motion, and to generate an identification signal, whereby through detecting, extracting and classifying the object, it is determined if the object is either a first entity form or a second entity form.

12. A computer program product as set forth in claim 11, wherein the computer program product further comprises computer instruction means stored on a computer readable medium, for:

cataloging separate frames in a video sequence; and filtering out noise from the separate frames.

13. A computer program product as set forth in claim 12, wherein in cataloging separate frames, the frames are separated using a module selected from a group consisting of an infrared video frame difference module and a visible spectrum video frame difference module.

14. A computer program product as set forth in claim 12, wherein in filtering out noise, the noise is filtered utilizing a technique selected from a group consisting of a morphological filter to detect and represent object motion; and a threshold filter for placing a value on a detected moving object, and if that value exceeds a predetermined threshold value, then the detected object is recognized as an object, else if that value is below the predetermined threshold value, then data representing the detected object is disregarded as noise.

15. A computer program product as set forth in claim 14, wherein the morphological filter uses a filter selected from a group consisting of size filter and close filter, where the size filter removes isolated points and small-sized objects in the video sequence and the close filter fills holes inside objects and smoothes object boundaries.

16. A computer program product as set forth in claim 11, wherein the space-time correlations are generated according to the following, given an input sequence f(x, y, t), the frame difference is defined as $df(x,y,t)=|f(x,y,t+1)-f(x,y,t)|$, with the space-time correlations defined as, $C_t(t)=Cor(df(x,y,t),df(x,y,t+\Delta t))$, $C_x(x)=Cor(df(x,y,t),df(x+\Delta x,y,t))$, $C_y(y)=Cor(df(x,y,t),df(x,y+\Delta y,t))$, where $$Cor(u, v) = \frac{Cov(u, v)}{\sqrt{Var(u)Var(v)}},$$

where $C_t(t)$, $C_x(x)$, and $C_y(y)$ are correlations (Cor) of each corresponding coordinate, and where covariance is denoted by Cov and variance is denoted by Var, and where u and v are any variable in the space time dimension, such as x, y, and t.

17. A computer program product as set forth in claim 11, wherein in extracting the motion features, the mean value is calculated according to the following, $mean_s=E[C_s]$, where $s \in \{x, y, t\}$, and where E[x] denotes the expectation of x and $C_s$ denotes the correlation of s.

18. A computer program product as set forth in claim 11, wherein in extracting the motion features, the Renyi Entropy is calculated in frequency domain, according to the following, $$h_s = \frac{1}{1-\alpha} \log_2 \left( \sum_i (p_s(i))^\alpha \right),$$

where $s \in \{x, y, t\}$, with a>0, and with a distribution being computed from a normalized histogram according to the following, $p_s=norm\_hist(f_s)$, where $s \in \{x,y,t\}$, and $f_s=FFT(C_s)$, where $s \in \{x,y,t\}$, where $FFT(C_s)$ denotes the Fast Fourier transformation of $C_s$, p denotes probability, i denotes a probability index, and a is the distributing parameter.

19. A computer program product as set forth in claim 11, wherein in classifying the motion features, a classifier is utilized for separating classes of motion, the classifier being selected from a group consisting of a support-vector-machine-based classifier, a Bayesian classifier, a neural network-based classifier, a decision tree classifier, and a Gaussian mixture model classifier.

20. A computer program product as set forth in claim 11, wherein in classifying the motion features extracted from the detected object as either a first entity motion or a second entity motion, the first entity is a human and the second entity is an animal.

21. A method for distinguishing motion between two different entity forms, comprising acts of:

detecting a moving object within a video sequence and generating a moving object signal;

receiving the moving object signal and generating a motion representation, generating space-time correlations of the motion representation and generating statistics of the space-time correlations for the detected object within the moving object signal, where the statistics of the space-time correlations are two statistics, Renyi Entropy and mean value with the two statistics calculated as motion features; and receiving and classifying the motion features extracted from the detected object as either a first entity motion or a second entity motion, and to generate an identification signal, whereby through detecting, extracting and classifying the object, it is determined if the object is either a first entity form or a second entity form.

22. A method as set forth in claim 21, further comprising acts of:

cataloging separate frames in a video sequence; and filtering out noise from the separate frames.

23. A method as set forth in claim 22, wherein in the act of cataloging separate frames, the frames are separated using a module selected from a group consisting of an infrared video frame difference module and a visible spectrum video frame difference module.

24. A method as set forth in claim 22, wherein in filtering out noise, the noise is filtered utilizing a technique selected from a group consisting of a morphological filter to detect and represent object motion; and a threshold filter for placing a value on a detected moving object, and if that value exceeds a predetermined threshold value, then the detected object is recognized as an object, else if that value is below the predetermined threshold value, then data representing the detected object is disregarded as noise.

25. A method as set forth in claim 24, wherein the morphological filter uses a filter selected from a group consisting of size filter and close filter, where the size filter removes isolated points and small-sized objects in the video sequence and the close filter fills holes inside objects and smoothes object boundaries.

26. A method as set forth in claim 21, wherein the space-time correlations are generated according to the following, given an input sequence f(x, y, t), the frame difference is defined as $$df(x,y,t) = |f(x,y,t+1) - f(x,y,t)|,$$

with the space-time correlations defined as, $$C_t(t) = Cor(df(x,y,t), df(x,y,t+\Delta t)),$$

$$C_x(x) = Cor(df(x,y,t), df(x+\Delta x,y,t)),$$

$$C_y(y) = Cor(df(x,y,t), df(x,y+\Delta y,t)),$$

where $$Cor(u, v) = \frac{Cov(u, v)}{\sqrt{Var(u)Var(v)}},$$

where $C_t(t)$, $C_x(x)$, and $C_y(y)$ are correlations (Cor) of each corresponding coordinate, and where covariance is denoted by Cov and variance is denoted by Var, and where u and v are any variable in the space time dimension, such as x, y, and t.

27. A method as set forth in claim 21, wherein in extracting the motion features, the mean value is calculated according to the following, mean$_s$ = E[$C_s$], where s∈{x, y, t}, and where E[x] denotes the expectation of x and $C_s$ denotes the correlation of s.

28. A method as set forth in claim 21, wherein in extracting the motion features, the Renyi Entropy is calculated in frequency domain, according to the following, $$h_s = \frac{1}{1-\alpha} \log_2 \left( \sum_i (p_s(i))^\alpha \right),$$

where s∈{x, y, t}, with a>0, and with a distribution being computed from a normalized histogram according to the following, $$p_s = norm\_hist(f_s), \text{ where } s \in \{x,y,t\}, \text{ and}$$

$$f_s = FFT(C_s), \text{ where } s \in \{x,y,t\}, \text{ where}$$

FFT($C_s$) denotes the Fast Fourier transformation of $C_s$, p denotes probability, i denotes a probability index, and a is the distributing parameter.

29. A method as set forth in claim 21, wherein in classifying the motion features, a classifier is utilized for separating classes of motion, the classifier being selected from a group consisting of a support-vector-machine-based classifier, a Bayesian classifier, a neural network-based classifier, a decision tree classifier, and a Gaussian mixture model classifier.

30. A method as set forth in claim 21, wherein in classifying the motion features extracted from the detected object as either a first entity motion or a second entity motion, the first entity is a human and the second entity is an animal.

* * * * *